United States Patent Office 2,970,078
Patented Jan. 31, 1961

2,970,078

POLYETHYLENE BOND AND METHOD THEREFOR

Alvin R. Nielsen, Hartford, Conn., assignor to Plax Corporation, West Hartford, Conn., a corporation of Delaware No Drawing. Filed May 6, 1954, Ser. No. 428,127

7 Claims. (Cl. 154—139)

The present invention relates to the bonding and cementing of polyethylene surfaces. Heretofore, difficulty has been experienced in cementing polyethylene products, the normally hydrophobic surface of polyethylene being unreceptive to most glues, adhesives and other bonding materials.

It has been discovered that when a saturated aqueous solution of chromium trioxide is spread between contacting surfaces of polyethylene and dried, the contacting surfaces are cemented together. The bond can be pulled apart but requires tensions which tend to tear two mil polyethylene film.

The drying may be effected at room temperature and may be accelerated by application of heat. However, drying must be effected before adhesion is obtained.

Acceleration of the drying time by heat darkens the bond which may range from a pale brown to a very dark brown. When drying is accelerated with heat, the bond develops a speckled appearance which probably is due to small bubbles of water vapor evaporated from the chromium trioxide solution. Because of its low permeation rate through polyethylene, the water vapor is temporarily entrapped and surrounded by a darker area of concentrated chromium trioxide. If the drying is effected at room temperature, water vapor and air bubbles apparently do not develop and a uniform thin bonding film results. Usually 18 to 24 hours are required for effective adhesion to develop at room temperature for one to two mil polyethylene. Dilute solutions of chromium trioxide do not produce good bonds and increase the speckled appearance when dried above room temperature. Saturated or approximately saturated solutions are required.

As an example, a few drops of a saturated solution warmed to 135° F. is applied over the surface of a strip of 1-2 mil polyethylene film. A second strip of the film is laid upon the coated surface and pressure applied to thin out the chromium trioxide solution therebetween. The strips were dried at room temperature for approximately 18 to 24 hours to produce an effective bond.

Similar results were obtained when drying was effected at 120° F. for approximately one to two hours. A good bond with a few bubbles was produced while drying at 160-180° F. for 8-10 minutes producing more bubbles and a speckled bond is effected which is somewhat weaker than those produced by drying at lower temperatures for longer times. However, in each instance the bond is at least sufficiently strong to hold a polyethylene film label or the like on a polyethylene bottle when subject to normal handling. However, when the film and bottle are immersed in water, the film begins to peel or strip from the bottle in the manner of a label bonded to a glass container by means of a water soluble adhesive.

While the saturated chromium trioxide solution preferably is applied warm wtihin a 135–175° F. range, lesser as well as greater temperatures may be used.

The effectiveness of the bond is not affected by the thickness of the polyethylene. However, the required drying time increases with the thickness of the films. It has been found that the thickness of the thinner of the two bonded layers determines the drying time required for a given drying temperature experience. While two layers of the same thickness require the minimum drying time for any particular drying temperature experience, increasing thickness of one of them to many times the thickness of the other does not greatly increase the drying time.

Polyethylene surfaces bonded in accordance with the present invention firmly adhere to each other.

The invention is not limited to bonding together two polyethylene surfaces or to bonding of surfaces of unsubstituted ethylene polymers. Substituted ethylene polymers and copolymers, such as chlorinated ethylene polymers, polytetrafluorethylene and other modified ethylene polymer surfaces may be bonded. In every instance, a saturated solution of chromium trioxide alone is all that is necessary as a bonding agent.

The solution also serves to bond ethylene polymer surfaces to surfaces of glass and other non-ethylene surfaces.

Different embodiments of the invention can be made without departing from the scope of the appended claims.

I claim:

1. The method of bonding two surfaces at least one of which is an ethylene polymer surface which comprises applying a coating of a substantially saturated aqueous solution of chromium trioxide to the surfaces, pressing the coated surfaces together while wet with the chromium trioxide solution, and drying the chromium trioxide coating between the contacting surfaces.

2. The method recited in claim 1 and wherein the chromium trioxide solution is applied within a temperature range of 135–175° F.

3. The method recited in claim 1 and wherein the drying is effected at substantially normal room temperature.

4. The method recited in claim 1 and wherein the drying is effected in a heated atmosphere within a 160°–180° F. temperature range.

5. The method recited in claim 1 and wherein both of the bonded surfaces are ethylene polymers.

6. An adhesively bonded ethylene polymer assembly comprising a surface of an ethylene polymer and an adjacent surface bonded together by an interposed layer of chromium trioxide dried from a concentrated aqueous solution in situ.

7. A bonded assembly as recited in claim 6 and wherein said adjacent surface is an ethylene polymer.

References Cited in the file of this patent

UNITED STATES PATENTS

| | | |
|---|---|---|
| 2,400,091 | Alfthan | May 14, 1946 |
| 2,400,099 | Brubaker et al. | May 14, 1946 |
| 2,480,298 | Happoldt | Aug. 30, 1949 |
| 2,601,336 | Smith-Johannsen | June 24, 1952 |
| 2,668,134 | Horton | Feb. 2, 1954 |

FOREIGN PATENTS

| | | |
|---|---|---|
| 660,398 | Great Britain | Mar. 28, 1949 |

OTHER REFERENCES

Jones: "Inorganic Chemistry," 1947, page 674.